(12) United States Patent
Chen et al.

(10) Patent No.: US 7,489,504 B2
(45) Date of Patent: Feb. 10, 2009

(54) MOUNTING APPARATUS FOR SECURING DATA STORAGE DEVICE

(75) Inventors: Yun-Lung Chen, Shenzhen (CN); Wen-Yu Zhang, Shenzhen (CN); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 11/306,534

(22) Filed: Dec. 31, 2005

(65) Prior Publication Data
US 2007/0153466 A1 Jul. 5, 2007

(51) Int. Cl.
*G06F 1/16* (2006.01)
(52) U.S. Cl. .................. 361/685; 248/200; 248/694
(58) Field of Classification Search .......... 248/694, 248/551, 200, 221.11, 222.13; 361/685, 361/684; 312/223.2
See application file for complete search history.

(56) References Cited

U.S. PATENT DOCUMENTS

| | | | |
|---|---|---|---|
| 4,979,909 A | 12/1990 | Andrews | |
| 6,625,014 B1 | 9/2003 | Tucker et al. | |
| 7,031,150 B2 * | 4/2006 | Chen et al. | 361/685 |
| 7,156,359 B2 * | 1/2007 | Dittmer et al. | 248/551 |
| 7,259,960 B2 * | 8/2007 | Hua et al. | 361/685 |
| 2002/0074476 A1 * | 6/2002 | Cooner et al. | 248/551 |
| 2005/0068721 A1 * | 3/2005 | Chen et al. | 361/685 |
| 2005/0127260 A1 * | 6/2005 | Dittmer | 248/221.11 |

* cited by examiner

*Primary Examiner*—Ramon O Ramirez
(74) *Attorney, Agent, or Firm*—Wei Te Chung

(57) ABSTRACT

A mounting apparatus is used to secure a data storage device (10). The data storage device has a mounting member (12) disposed thereon. The mounting apparatus includes a bracket (30) for accommodating the data storage device, and a latch member (50) removably attached to the bracket. The bracket includes a side plate (32), which defines a through opening therein, for receiving the mounting member of the data storage device along a first direction. A guideway (327) is disposed on the side plate. The guideway extends in a second direction perpendicular to the first direction. After the mounting member of the data storage device is received into through opening of the bracket, the latch member is inserted into the guideway, thereby preventing the mounting member from disengaging from the through opening.

19 Claims, 3 Drawing Sheets

MOUNTING APPARATUS FOR SECURING DATA STORAGE DEVICE

FIELD OF THE INVENTION

The present invention relates to mounting apparatuses, and more particularly to a mounting apparatus for securing data storage devices, such as hard disk drives, floppy disk drives, Compact Disk Read-Only Memory (CD-ROM) drives, etc.

DESCRIPTION OF RELATED ART

Usually, a data storage device is simply screwed to a computer enclosure. This conventional mounting means substantially wastes time, and thus adds to the complexity and difficulty of assembling the data storage device to the computer enclosure and later disassembling therefrom.

Another kind of mounting apparatus includes a bracket, a pair of slide members attached to the data storage device, and a pair of levers pivotably secured to the bracket. The bracket defines a pair of through openings therein. The slide members are disposed on the data storage device. Each slide member has a resilient engagement portion, for engaging into the through openings of the bracket respectively. Each of the levers has a projecting portion for urging the corresponding engagement portion of the slide member to resiliently deform. In assembly, the data storage device together with the slide members is inserted into the bracket. When the engagement portions of the slide members are received into the through openings of the bracket, the data storage device is thus secured into the bracket. At this time, the projecting portions of the levers abut against the engagement portions of the slide members respectively. In removing the data storage device, the levers are pivoted to have the projecting portions resiliently deform the engagement portions of the slide members respectively, thereby disengaging the engagement portions from the corresponding through openings of the bracket. Thus, the data storage device can be removed from the bracket. However, due to the number of elements needed and the complexity of the structure, the mounting apparatus described above is expensive to manufacture.

What is needed, therefore, is a mounting apparatus conveniently securing a storage device to a bracket of a computer enclosure and having a simple structure.

SUMMARY OF INVENTION

A mounting apparatus is used to secure a data storage device. The data storage device has a mounting member disposed thereon. The mounting apparatus includes a bracket for accommodating the data storage device, and a latch member removably attached to the bracket. The bracket includes a side plate which defines a through opening therein, for receiving the mounting member of the data storage device along a first direction. A guideway is disposed on the side plate. The guideway extends in a second direction perpendicular to the first direction. After the mounting member of the data storage device is received into through opening of the bracket, the latch member is inserted into the guideway, thereby preventing the mounting member from disengaging from the through opening.

Other advantages and novel features will be drawn from the following detailed description of preferred embodiments with attached drawings, in which:

DETAILED DESCRIPTION

Figure 1:
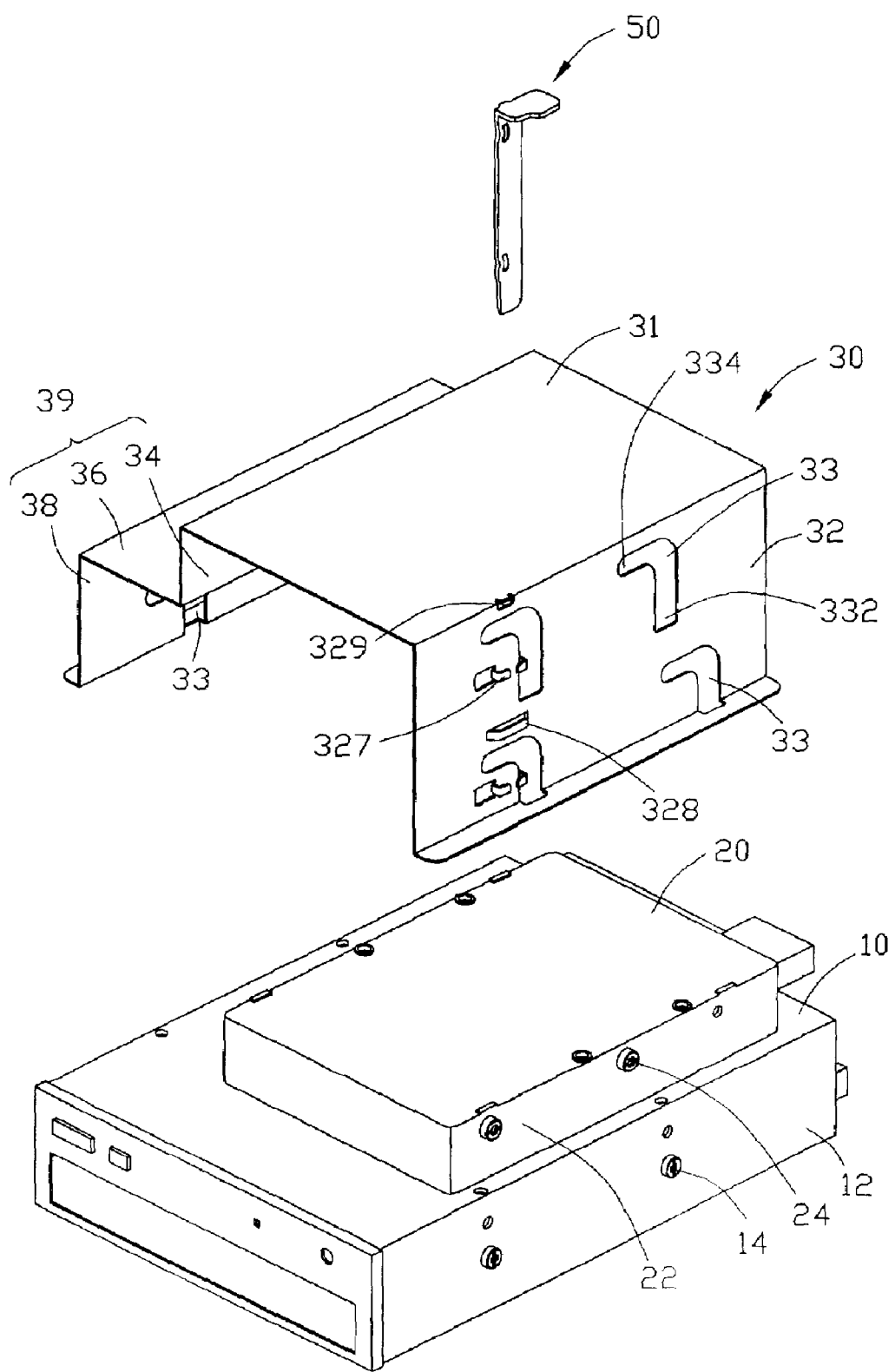
FIG. 1 is an exploded, isometric view of a mounting apparatus of a preferred embodiment, together with data storage devices, the mounting apparatus including a bracket, and a latch member.

Referring to FIG. 1, a mounting apparatus is used to secure data storage devices 10, 20. The data storage devices 10, 20 may, for example, be hard disk drives, floppy disk drives, Compact Disk Read-Only Memory (CD-ROM) drives, etc. Each of the data storage devices 10, 20 includes a pair of sidewalls 12, 22 (only one sidewall of each of the data storage device can be seen in FIG. 1). Two mounting members 14, 24, such as screws, are disposed on each of the sidewalls 12, 22. The mounting apparatus includes a bracket 30 for accommodating the data storage devices 10, 20, and a latch member 50 removably attached to the bracket 30 for locating the data storage devices 10, 20 in the bracket 30.

The bracket 30 includes a base plate 31, a first side plate 32, and a second side plate 39. The first and second side plates 32, 39 are perpendicularly bent from opposite edges of the bottom plate 31. The second side plate 39 includes a first vertical plate 34, a horizontal plate 36, and a second vertical plate 38. A plurality of generally L-shaped through openings 33 is defined in the first side plate 32, and the first and second vertical plates 34, 38 respectively, for receiving the mounting members 14, 24 of the data storage devices 10, 20. Each through opening 33 includes a vertical guiding hole 332, and a horizontal locating hole 334. A pair of guide clips 327, a bridge clip 328, and a positioning hole 329 is arranged on the first side plate 32 along a vertical direction. The guide clips 327 and the bridge clip 328 together define a guideway on the first side plate 32. Each of the guide clips 327 is disposed on a side of the vertical guiding hole 332 of the corresponding through openings 33, and includes a pair of generally L-shaped tabs opposite to each other. The bridge clip 328 is formed on the first side plate 32 by stamping, between the two through openings 33. A space is thus defined between the bridge clip 328 and the side plate 32 for the latch member 50 inserting therethrough. The positioning hole 329 is defined in the first side plate 32, adjacent the base plate 31.

Figure 2:
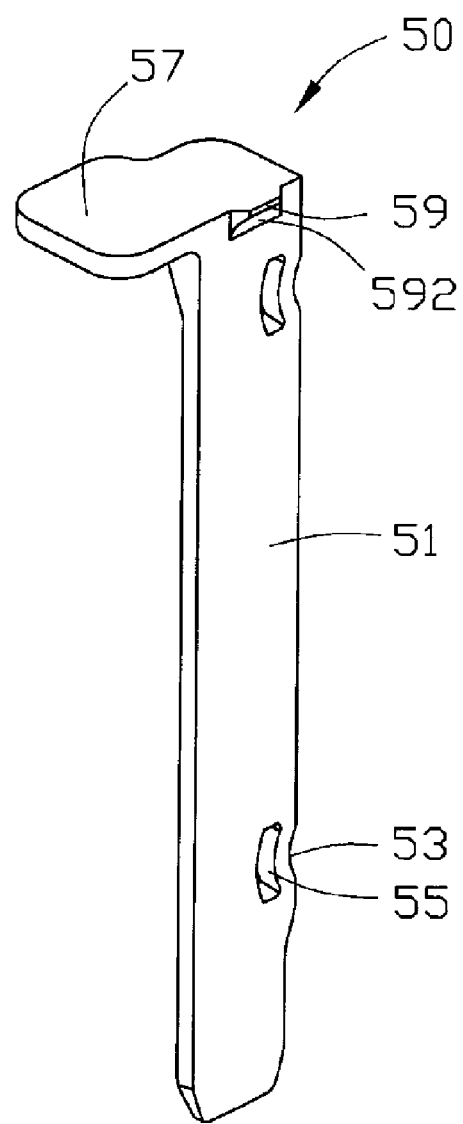
FIG. 2 is an enlarged, isometric view of the latch member of FIG. 1.

Referring to FIG. 2, the latch member 50 includes an elongated securing portion 51, and an operating portion 57. The operating portion 57 is perpendicularly bent from a top end of the securing portion 51. The securing portion 51 inserts into and slides along the guideway of the first side plate 32. Two concave locating portions 53 are formed at an edge of the securing portion 51, for receiving the mounting members 14, 24 of the data storage devices 10, 20 respectively. Two arc-shaped through holes 55 are respectively defined in the securing portion 51 adjacent the locating portions 53, allowing the locating portions 53 to resiliently deform. A wedge shaped locking protrusion 59 is disposed at a top end of the securing portion 51, adjacent the operating portion 57, for engaging into the positioning hole 329 of the first side plate 32 of the bracket 30. A smooth transition surface 592 is formed on a bottom portion of the locking protrusion 59, for the locking portion 57 to easily engage into the positioning hole 329 of the first side plate 32.

Figure 3:
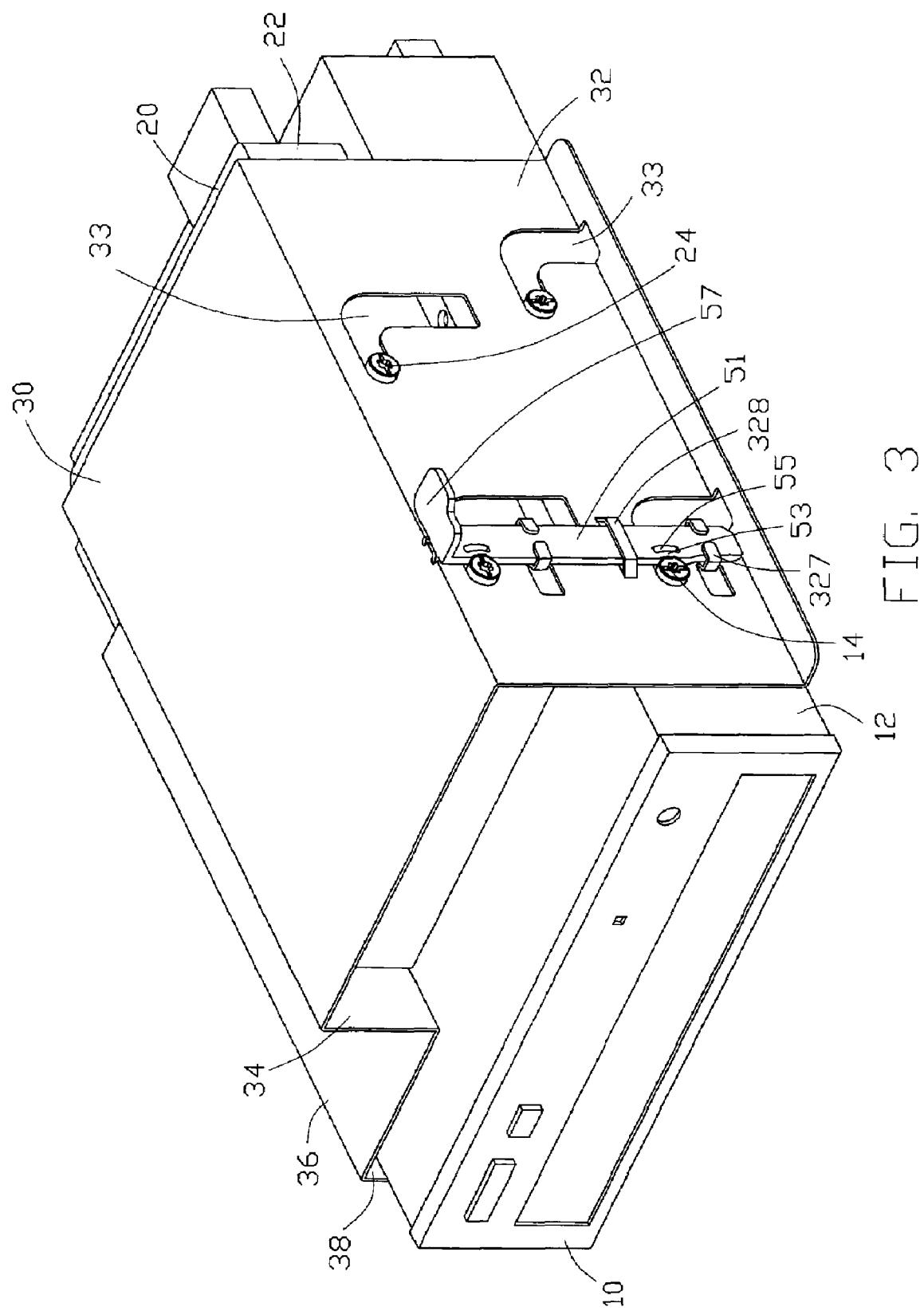
FIG. 3 is an assembled view of FIG. 1.

Referring also to FIG. 3, in assembly of the data storage devices 10, 20, the mounting members 14, 24 are horizontally (a first direction) received into the corresponding locating holes 334 of the through openings 33 of the first and second side plates 32, 39 respectively, via the corresponding guiding holes 332. The data storage device 20 is held between the first side plate 32 and the first vertical plate 34, and the data storage device 10 is held between the first side plate 32 and the second vertical plate 38. Then the securing portion 51 of the latch member 50 inserts into and slides in the guideway of the first side plate 32 (along a second direction vertical to the first direction), and blocks the mounting members 14, 24 into the corresponding locating holes 334 of the through openings 33. As the top edge of the first side plate 32 of the bracket 30 relatively slides on the smooth transition surface 592 of the locking protrusion 59, the securing portion 51 is pressed to gradually resiliently deform out. When the locking protrusion 59 of the latch member 50 reaches the positioning hole 329 of the first side plate 32 of the bracket 30, the securing portion 51 rebounds, thereby the locking protrusion 50 engaging into the positioning hole 329. The latch member 50 is therefore secured in the guideway of the first side plate 32 of the bracket 30. The concave locating portions 53 of the latch member 50 abut against the mounting members 14, 24, respectively. The data storage devices 10, 20 are thus secured in the bracket 30.

In removal of the data storage devices 10, 20, the operating portion 57 is deformed outwardly to have the locking protrusion 59 disengage from the positioning hole 329 of the bracket 30. Then the latch member 50 is pulled up vertically. The securing portion 51 slides out from the guide clips 327 and the bridge clip 328 of the first side plate 32, and is taken away from the bracket 30. When the latch member 50 is taken away from the first side plate 32, the mounting members 14, 24 of the data storage devices 10, 20 can then be disengaged from the through openings 33 of the bracket 30. Accordingly, the data storage devices 10, 20 can then be taken away from the bracket 30.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for securing a data storage device with a mounting member disposed thereon, comprising:
    a bracket for accommodating the data storage device, the bracket comprising a side plate which defines a through opening therein, for receiving the mounting member of the data storage device along a first direction, a guideway disposed on the side plate, the guideway extending in a second direction perpendicular to the first direction; and
    a latch member removably attached to the bracket;
    wherein after the mounting member of the data storage device is received into the through opening of the bracket, the latch member is inserted into the guideway, thereby preventing the mounting member from disengaging from the through opening;
    wherein the latch member comprises an elongated securing portion slidably received by the guideway of the bracket, and an operating portion perpendicular to the securing portion for urging the securing portion to resiliently deform.

2. The mounting apparatus as described in claim 1, wherein a locking protrusion is disposed on the latch member, and the side plate of the bracket defines a positioning hole therein to receive the locking protrusion, thereby positioning the latch member on the side plate.

3. The mounting apparatus as described in claim 1, wherein a concave locating portion is disposed on the securing portion of the latch member for engaging with the mounting member of the data storage device, thereby positioning the latch member on the side plate.

4. The mounting apparatus as described in claim 3, wherein the securing portion of the latch member defines a through hole in a side of the locating portion for allowing the locating portion to resiliently deform.

5. The mounting apparatus as described in claim 4, wherein the through hole is generally arc-shaped.

6. The mounting apparatus as described in claim 1, wherein the through opening is generally L-shaped, and has a vertical guide hole for the mounting member inserting thereinto along a direction parallel to the second direction, and a horizontal locating hole for the mounting member sliding therein along the first direction.

7. The mounting apparatus as described in claim 1, wherein the guideway comprises at least one guide clip protruding from the side plate, and the guide clip has a pair of generally L-shaped tabs opposite to each other.

8. The mounting apparatus as described in claim 7, wherein the guideway further comprises a bridge clip protruding from the side plate, and the latch member is inserted through a space formed between the bridge clip and the side plate.

9. A mounting apparatus assembly, comprising:
    a data storage device having a mounting member disposed thereon;
    a bracket accommodating the data storage device therein, the bracket defining a through opening therein receiving the mounting member of the data storage device, a guideway disposed on the bracket;
    a latch member removably attached to the bracket; and
    a positioning mechanism formed on the bracket and the latch member, the positioning mechanism locating the latch member on the bracket; wherein
    after the mounting member of the data storage device is received into the through opening of the bracket, the latch member is inserted into the guideway, thereby preventing the mounting member from disengaging from the through opening.

10. The mounting apparatus assembly as described in claim 9, wherein the through opening is generally L-shaped, and comprises a vertical guide hole for the mounting member inserting thereinto, and a horizontal locating hole for positioning the mounting member.

11. The mounting apparatus assembly as described in claim 9, wherein the positioning mechanism comprises a wedge shaped locking protrusion disposed on the latch member, and a positioning hole defined in the bracket, for receiving the locking protrusion.

12. The mounting apparatus assembly as described in claim 9, wherein a concave locating portion is disposed on the latch member for engaging with the mounting member of the data storage device, thereby positioning the latch member on the bracket.

13. The mounting apparatus assembly as described in claim 12, wherein the latch member defines a through bole adjacent the locating portion, allowing the locating portion to resiliently deform.

14. The mounting apparatus assembly as described in claim 9, wherein the guideway comprises at least one guide clip protruding from the bracket, and the at least one guide clip has a pair of generally L-shaped tabs opposite to each other.

15. The mounting apparatus assembly as described in claim 14, wherein the guideway further comprises a bridge clip protruding from the bracket, and the latch member is inserted through a space defined between the bridge clip and the bracket.

16. A mounting apparatus for a data storage device comprising:
- a bracket being configured for accommodating the data storage device therein, the bracket comprising a side plate defining a through hole therein, the through hole having at least one section extending along a first axis, the through hole being configured for receiving a mounting member of the data storage device through one end of the through hole; and
- a latch member attached to the side plate and being operable to slide between a locked position and an unlocked position along a second axis different from the first axis, the latch member comprising a longitudinal edge extending along the second axis, the longitudinal edge being configured for cooperating with the bracket to engagingly sandwich the mounting member at said one end of the through hole when the latch member is in the locked position, and releasing the mounting member therefrom when the latch member is in the unlocked position;
- wherein a locating portion is disposed on the longitudinal edge of the latch member for engaging with the mounting member of the data storage device when the latch member is in the locked position, the latch member defines a trough hole adjacent the locating portion for allowing the locating portion to resiliently deform.

17. The mounting apparatus of claim 16, wherein the second axis is perpendicular to the first axis.

18. The mounting apparatus of claim 16, wherein the side plate forms a guideway along which the latch member slides, and the guideway is defined by stamping portions of the side plate.

19. The mounting apparatus of claim 18, wherein the latch member further comprises an elongated securing portion slidably received by the guideway of the bracket, and an operating portion perpendicular to the securing portion for urging the securing portion to resiliently deform, the longitudinal edge is one edge of the securing portion.

* * * * *